(12) United States Patent
Sato et al.

(10) Patent No.: US 10,875,384 B2
(45) Date of Patent: Dec. 29, 2020

(54) AIR FLOW CIRCULATION STRUCTURE FOR VEHICLE

(71) Applicant: DENSO CORPORATION, Kariya (JP)

(72) Inventors: Go Sato, Kariya (JP); Wei Chen, Kariya (JP)

(73) Assignee: DENSO CORPORATION, Kariya (JP)

( * ) Notice: Subject to any disclaimer, the term of this patent is extended or adjusted under 35 U.S.C. 154(b) by 66 days.

(21) Appl. No.: 16/395,283

(22) Filed: Apr. 26, 2019

(65) Prior Publication Data

US 2019/0248206 A1 Aug. 15, 2019

Related U.S. Application Data

(63) Continuation of application No. PCT/JP2017/038333, filed on Oct. 24, 2017.

(30) Foreign Application Priority Data

Nov. 15, 2016 (JP) .................................. 2016-222176

(51) Int. Cl.
*F01P 7/02* (2006.01)
*B60H 1/00* (2006.01)
(Continued)

(52) U.S. Cl.
CPC ..... *B60H 1/00642* (2013.01); *B60H 1/00028* (2013.01); *B60H 1/00885* (2013.01);
(Continued)

(58) Field of Classification Search
CPC ............ B60H 1/00642; B60H 1/00028; B60H 1/00885; B60H 1/00899; B60H 1/02;
(Continued)

(56) References Cited

U.S. PATENT DOCUMENTS 5,483,805 A * 1/1996 Fujii .................. B60H 1/00392
62/158
6,422,308 B1 * 7/2002 Okawara ............ B60H 1/00921
165/202

(Continued)

FOREIGN PATENT DOCUMENTS

JP S60110013 U 7/1985
JP H05026509 A 2/1993
(Continued)

*Primary Examiner* — Davis D Hwu
(74) *Attorney, Agent, or Firm* — Harness, Dickey & Pierce, P.L.C.

(57) ABSTRACT

An air flow circulation structure for a vehicle includes a front shutter that opens or closes an outside air intake port, a fan and a duct member. The fan is configured to cause air to flow in a direction oriented from the outside air intake port through a heat exchanger toward an engine compartment when the front shutter is in an open state, and to cause the air to flow in a direction oriented from the engine compartment through the heat exchanger toward the outside air intake port when the front shutter is in a closed state. The duct member is configured to guide the air that is changed in direction by blowing from the fan and colliding with the front shutter to a heat source of the vehicle, when the front shutter is in the closed state.

11 Claims, 13 Drawing Sheets

(51) Int. Cl.
  *B60H 1/02*   (2006.01)
  *B60H 1/03*   (2006.01)
  *B60K 11/04*  (2006.01)
  *B60H 1/32*   (2006.01)
  *B60H 1/22*   (2006.01)

(52) U.S. Cl.
  CPC ........... *B60H 1/00899* (2013.01); *B60H 1/02* (2013.01); *B60H 1/025* (2013.01); *B60H 1/03* (2013.01); *B60H 1/22* (2013.01); *B60H 1/32* (2013.01); *B60K 11/04* (2013.01); *B60H 2001/00185* (2013.01); *B60H 2001/00192* (2013.01)

(58) Field of Classification Search
  CPC . B60H 1/025; B60H 1/03; B60H 1/22; B60H 1/32; B60H 2001/00185; B60H 2001/00192; B60K 11/04
  USPC ....................................................... 123/41.04
  See application file for complete search history.

(56) References Cited

U.S. PATENT DOCUMENTS

2004/0069481 A1    4/2004   Ebara et al.
2015/0136353 A1    5/2015   Niemann et al.

FOREIGN PATENT DOCUMENTS

| | | |
|---|---|---|
| JP | H11245651 A | 9/1999 |
| JP | 3600164 B2 | 12/2004 |
| JP | 2007055274 A | 3/2007 |
| JP | 2008221997 A | 9/2008 |
| JP | 2012246790 A | 12/2012 |
| JP | 2013-170508 A | 9/2013 |
| JP | 2014189077 A | 10/2014 |
| JP | 2015101333 A | 6/2015 |
| WO | WO-2017169501 A1 | 10/2017 |

* cited by examiner

AIR FLOW CIRCULATION STRUCTURE FOR VEHICLE

CROSS REFERENCE TO RELATED APPLICATIONS

The present application is a continuation application of International Patent Application No. PCT/JP2017/038333 filed on Oct. 24, 2017, which designated the United States and claims the benefit of priority from Japanese Patent Application No. 2016-222176 filed on Nov. 15, 2016. The entire disclosures of all of the above applications are incorporated herein by reference.

TECHNICAL FIELD

The present disclosure relates to an air flow circulation structure for a vehicle.

BACKGROUND

Conventionally, a front module may include a vehicle front element having an outside air opening, an air flow passage that connects the outside air opening directly to a vehicle engine chamber, a heat exchanger, a fan, and an outside air flap. For example, the heat exchanger may be a heat exchanger for a vehicle air conditioning system and may be adapted to be selectively used as a refrigerant condenser or a refrigerant evaporator disposed in an air flow passage.

SUMMARY

An air flow circulation structure for a vehicle according to at least one embodiment of the present disclosure may be configured to circulate air to a heat exchanger of a heat pump cycle disposed between an outside air intake port and an engine compartment of a vehicle. The air flow circulation structure may include: a front shutter configured to open or close the outside air intake port; a fan configured to cause air to flow in a direction oriented from the outside air intake port through the heat exchanger toward the engine compartment when the front shutter is in an open state, and to cause the air to flow in a direction oriented from the engine compartment through the heat exchanger toward the outside air intake port when the front shutter is in a closed state; and a duct member configured to guide the air that is changed in direction by blowing from the fan and colliding with the front shutter, to a heat source of the vehicle, when the front shutter is in the closed state. In this case, the air heated by the heat source can be more effectively supplied to the heat exchanger

DESCRIPTION OF EMBODIMENTS

Figure 1:
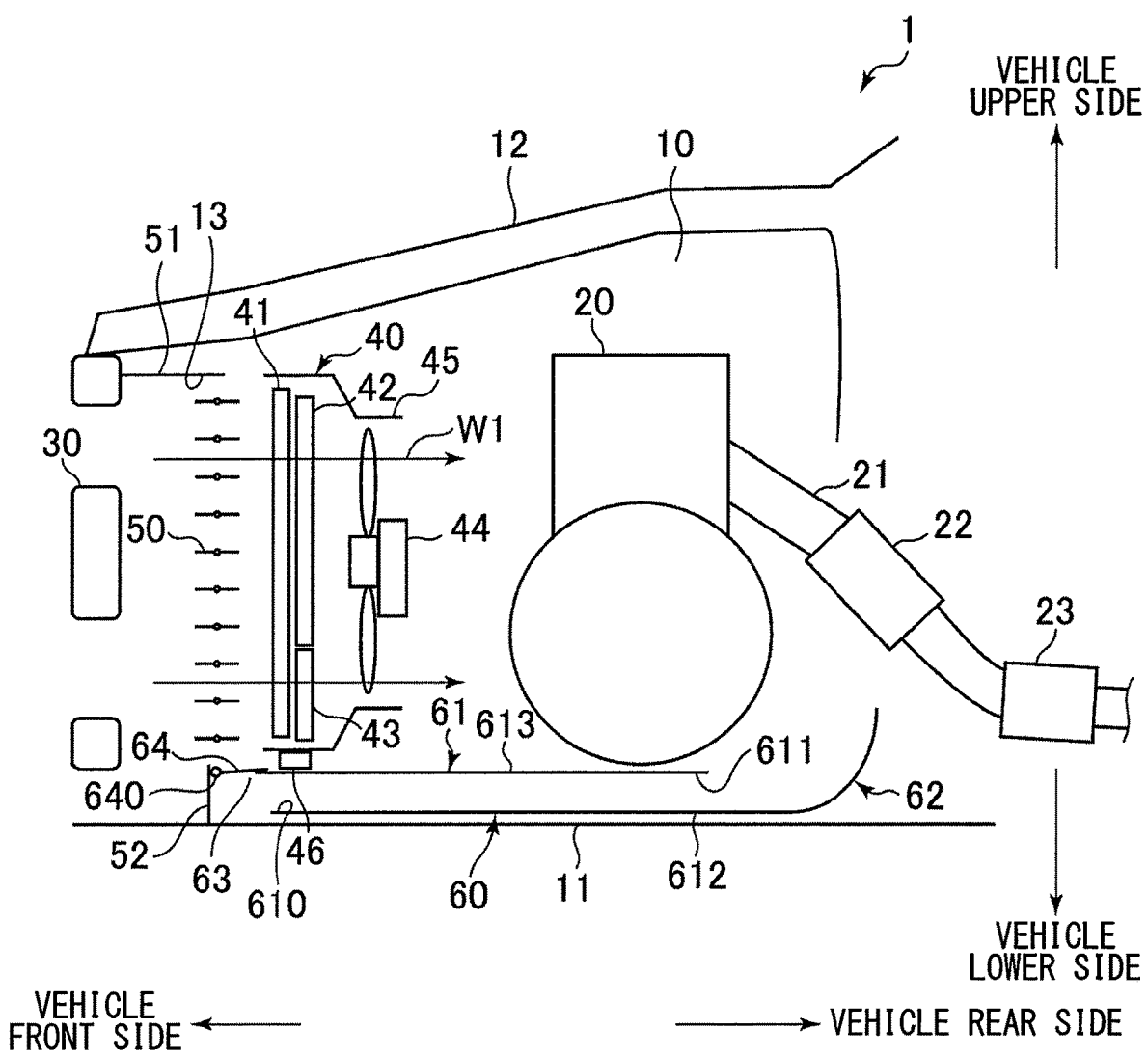
FIG. 1 is a diagram schematically showing a schematic configuration of a front portion of a vehicle according to an embodiment.

In a front module of a vehicle, a fan may be disposed in an air flow passage for blowing an air to a heat exchanger. The fan is configured to be reversely rotatable, and blows an outside air from the outside air opening toward an engine room in a first operation mode, and blows an air from the engine room toward the outside air opening in a second operation mode.

An outside air flap opens or closes the outside air opening. When the fan is in the first operation mode, the outside air flap is open. When the fan is in the second operation mode, the outside air flap is closed.

In the front module disclosed above, when the fan is in the second operation mode, a high temperature air heated in the engine room passes through the heat exchanger when the air is directed toward the outside air opening by the fan, to thereby prevent the heat exchanger from being frozen. In addition, since the outside air flap is in a closed state, the outside air passing through the heat exchanger and going to the outside air opening collides with the outside air flap and then returns to the engine room.

In the above front module, when the fan operates in the second operation mode, a reflux air returning to the engine room against the outside air flap passes through an outside of an outer periphery of the fan. When the reflux air passes outside the outer periphery of the fan, there is a possibility that a part of the reflux air is drawn into the air flow generated by rotation of the fan. In that case, the air that collides with the outside air flap flows into the heat exchanger without being heated in the engine room. When a short circuit is generated in the air flow in this manner, a heat is less likely to be applied to the heat exchanger. Therefore, when the heat exchanger is used as an evaporator of the heat pump cycle, the heat is less likely to be applied to the heat exchanger, resulting in the deterioration of a heating performance of a heat pump cycle.

It is an object of at least one example or one embodiment of the present disclosure to provide a vehicle air flow circulation structure which is capable of improving a heating performance of a heat pump cycle.

In the at least one example or one embodiment of the present disclosure, because air that collides with a front shutter can be reliably guided to a heat source by using a duct member, a short circuit is less likely to occur in the air flow. In other words, because the air heated by the heat source can be more reliably supplied to the heat exchanger, a temperature raising efficiency of the heat exchanger can be enhanced. As a result, the heating performance of the heat pump cycle can be improved.

Hereinafter, embodiments of a vehicle air flow circulation structure will be described with reference to the drawings. In order to facilitate understanding of the description, the same reference numerals are assigned to identical components in the respective drawings as much as possible, and a repetitive description of the identical components will be omitted.

As shown in FIG. 1, in a vehicle 1 according to the present embodiment, a front shutter 50, a heat exchange unit 40, and an engine 20 are disposed in this order from a front grill 30 toward a rear of the vehicle.

The engine 20 is disposed in an engine compartment 10. A lower portion of the engine compartment 10 is covered with an under cover 11. An upper portion of the engine compartment 10 is covered with a front hood 12 so as to be freely opened or closed.

An exhaust pipe 21 for exhausting an exhaust air of the engine 20 is connected to a rear surface of the engine 20 on the rear side of the vehicle. In the exhaust pipe 21, a first exhaust purification catalyst 22 and a second exhaust purification catalyst 23 are provided in a stated order toward downstream in a flow direction of the exhaust gas. As the first exhaust purification catalyst 22, for example, a three-way catalyst can be used. As the second exhaust purification catalyst 23, for example, a NOx storage reduction type catalyst can be used. The exhaust gas discharged from the engine 20 to the exhaust pipe 21 is purified through the first exhaust purification catalyst 22 and the second exhaust purification catalyst 23, and then discharged to the outside of the vehicle 1.

Figure 2:
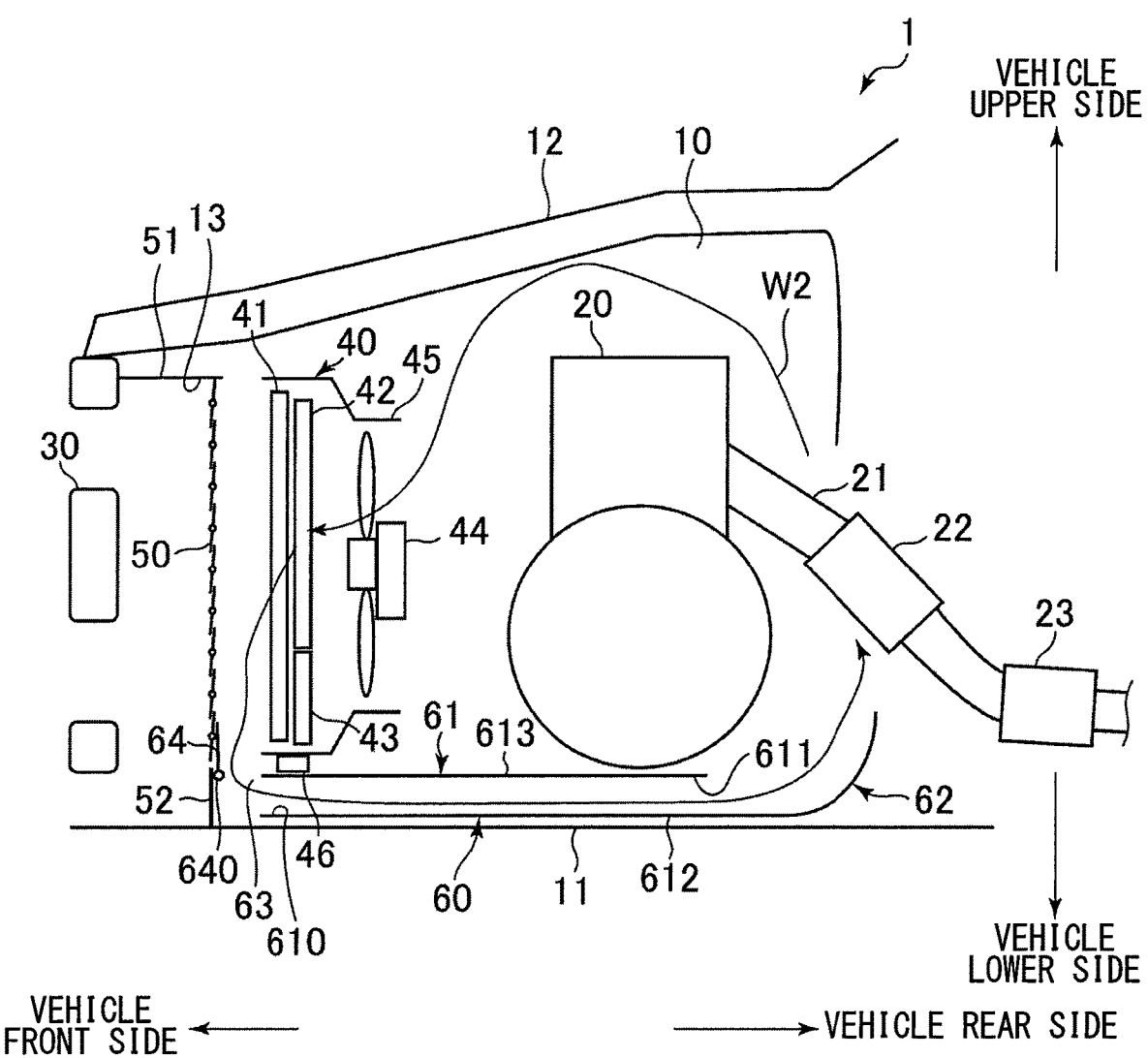
FIG. 2 is a diagram schematically showing the schematic configuration of the front portion of the vehicle according to the embodiment.

The front shutter 50 opens or closes an outside air intake port 13 provided between the front grill 30 and the heat exchange unit 40. The outside air intake port 13 is an opening portion provided between an inner wall portion 51 extending from an end portion of the front grill 30 above the vehicle toward a rear of the vehicle and a protrusion wall 52 extending from the under cover 11 toward the upper side of the vehicle. As shown in FIG. 1, when the front shutter 50 is in an open state, an outside air, which is an air outside the vehicle introduced from the front grill 30 flows into the engine compartment 10 through the heat exchange unit 40. As shown in FIG. 2, when the front shutter 50 is in the closed state, the introduction of the outside air from the front grill 30 into the engine compartment 10 is blocked.

The heat exchange unit 40 includes an exterior heat exchanger 41, a high-temperature radiator 42, a low-temperature radiator 43, a fan device 44, and a shroud 45.

The high-temperature radiator 42 and the low-temperature radiator 43 are placed side by side in a vehicle vertical direction. A high temperature coolant water for cooling the engine 20 flows through the high-temperature radiator 42. In the high-temperature radiator 42, a high temperature coolant water is cooled by a heat exchange between the high temperature coolant water flowing in the high-temperature radiator 42 and an air flowing outside the high-temperature radiator 42. A low temperature coolant water for cooling an inverter device or the like mounted on the vehicle 1 flows through the low-temperature radiator 43. In the low-temperature radiator 43, the low temperature coolant water is cooled by the heat exchange between the low temperature coolant water flowing in the low-temperature radiator 43 and the air flowing outside the low-temperature radiator 43.

The exterior heat exchanger 41 is disposed in front of the vehicle with respect to the high-temperature radiator 42 and the low-temperature radiator 43. The refrigerant circulating in the heat pump cycle of the air conditioner mounted on the vehicle 1 flows through the exterior heat exchanger 41. The air conditioner is a device that blows an air to be conditioned into the vehicle interior, to thereby adjust a temperature in the vehicle interior. In the exterior heat exchanger 41, the heat exchange is performed between the refrigerant flowing in the exterior heat exchanger 41 and the air flowing outside the exterior heat exchanger 41. The heat pump cycle is of a known configuration. The operation of the heat pump cycle will be briefly described as follows.

When the air conditioner is cooling the vehicle interior, the heat pump cycle operates in a cooling mode for cooling the air to be conditioned which is ventilated into the vehicle interior. When the heat pump cycle is operated in the cooling mode, the heat exchange is performed between the evaporator of the heat pump cycle and the air to be conditioned, whereby the refrigerant flowing through the evaporator evaporates, and the air to be conditioned is cooled by a latent heat of evaporation. At this time, the exterior heat exchanger 41 functions as a condenser for condensing the refrigerant by performing the heat exchange between the refrigerant circulating in the heat pump cycle and the outside air.

On the other hand, when the air conditioner is heating the vehicle interior, basically, the heat exchange is performed between a heater core through which a coolant water of the engine 20 flows and the air to be conditioned, to thereby heat the air to be conditioned. However, in a situation where a temperature of the coolant water for the engine 20 is low, for example, at the time of starting the engine 20, a temperature of the heater core is less likely to rise, so that the air to be conditioned cannot be sufficiently heated. In such a situation, the heat pump cycle operates in a heating mode for heating the coolant water flowing through the heater core. When the heat pump cycle is operating in the heating mode, the coolant water is heated by the heat exchange between the water refrigerant heat exchanger of the heat pump cycle and the coolant water flowing through the heater core. As a result, the temperature of the heater core can be raised, so that the air to be conditioning is heated. At this time, the exterior heat exchanger 41 functions as an evaporator for evaporating the refrigerant by performing the heat exchange between the refrigerant circulating in the heat pump cycle and the outside air.

The fan device 44 is disposed rearward of the high-temperature radiator 42 and the low-temperature radiator 43 in the vehicle. The fan device 44 can be operated by switching a rotation direction between a forward rotation and a reverse rotation. When the fan device 44 rotates forward, the air is blown in a direction from the front shutter 50 toward the engine compartment 10. When the fan device 44 rotates in the reverse direction, the air is blown in a direction from the engine compartment 10 toward the front shutter 50.

The shroud 45 is formed in a cylindrical shape so as to cover a periphery of the exterior heat exchanger 41, the high-temperature radiator 42, the low-temperature radiator 43, and the fan device 44. The shroud 45 guides a flow of air generated by the fan device 44 to the exterior heat exchanger 41, the high-temperature radiator 42, and the low-temperature radiator 43. An under duct 60 is provided between the shroud 45 and the under cover 11. According to the present embodiment, the under duct 60 corresponds to a duct member.

The under duct 60 includes a main body portion 61 and an air guide plate 62.

Figure 3:
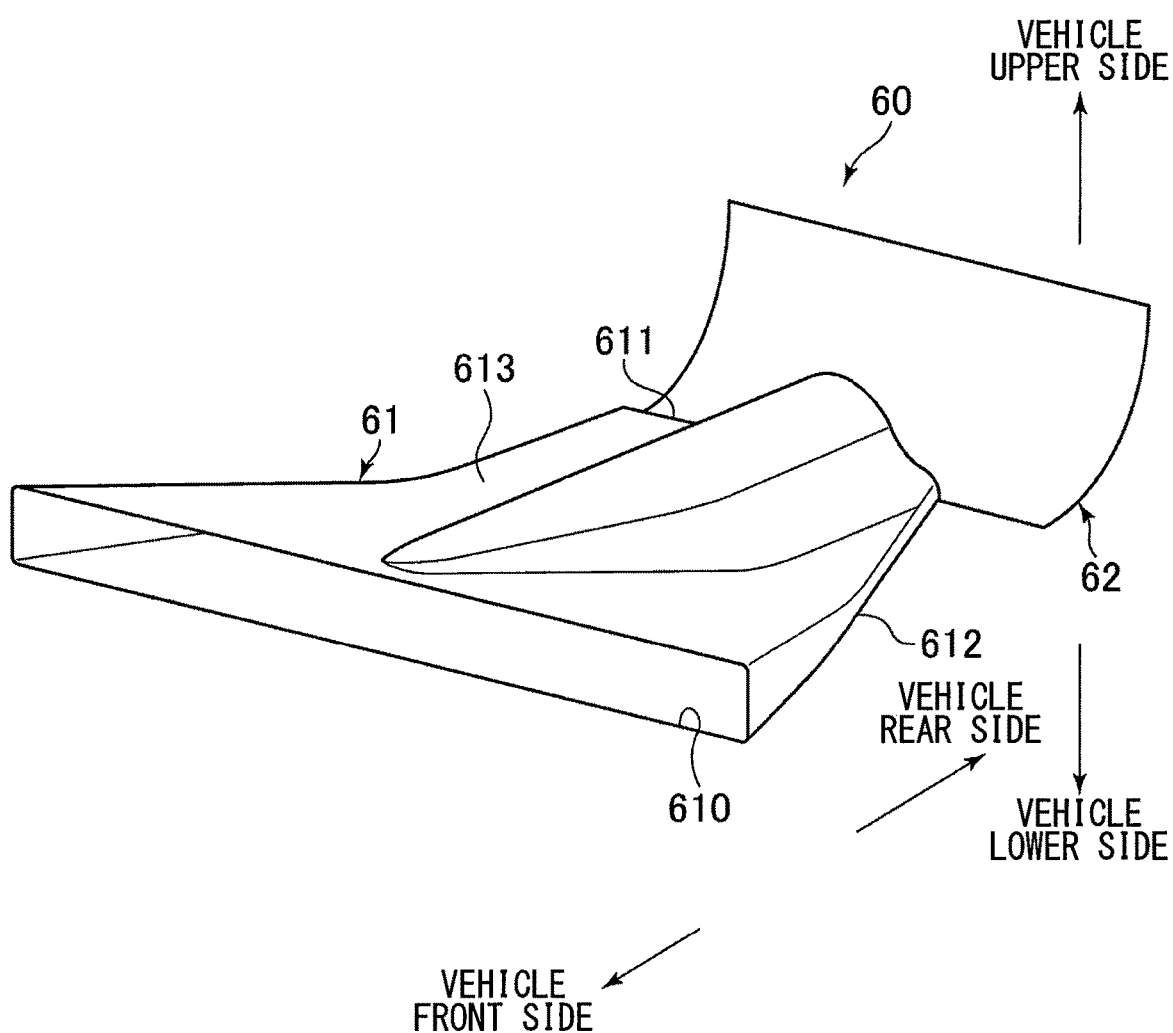
FIG. 3 is a perspective view showing a perspective structure of an under duct according to the embodiment.

The main body portion 61 is formed of a cylindrical member extending in the front-rear direction of the vehicle. A sealing member 46 for ensuring sealing performance is disposed in a gap between the main body portion 61 and the shroud 45. An opening portion of the main body portion 61 on the front side of the vehicle is an introduction port 610 into which the air is introduced. An opening portion of the main body portion 61 on the rear side of the vehicle is a discharge port 611 through which the air is discharged. As shown in FIG. 3, a flow channel cross-sectional area of the main body portion 61 is narrower from the introduction port 610 toward the discharge port 611. As a result, a speed of the air introduced from the introduction port 610 increases toward the discharge port 611.

As shown in FIGS. 1 and 2, the air guide plate 62 is formed so as to extend rearward of the vehicle from an end portion of a bottom wall portion 612 of the main body portion 61 on the discharge port 611 side. As shown in FIGS. 1 to 3, the air guide plate 62 is formed so as to curve upward toward the rear of the vehicle. The air guide plate 62 changes a direction of the air discharged from the discharge port 611 of the main body portion 61 to a direction oriented to the first exhaust purification catalyst 22. The first exhaust purification catalyst 22 generates a heat when purifying an exhaust gas. Therefore, the air guided to the first exhaust purification catalyst 22 by the air guide plate 62 absorbs the heat from the first exhaust purification catalyst 22 and is heated when passing through the first exhaust purification catalyst 22. As described above, according to the present embodiment, the first exhaust purification catalyst 22 functions as a heat source for heating the air.

A flow channel 63 connected to the introduction port 610 of the main body portion 61 is provided between an end portion of an upper wall portion 613 of the main body portion 61 of the under duct 60 on the vehicle front side and the protrusion wall 52 protruding upward of the vehicle from the under cover 11. The protrusion wall 52 is provided with an under shutter 64 for opening and closing the flow channel 63. The under shutter 64 opens or closes the flow channel 63 by rotating about a rotation shaft 640 provided on the protrusion wall 52. The under shutter 64 opens or closes in conjunction with the front shutter 50.

Figure 4:
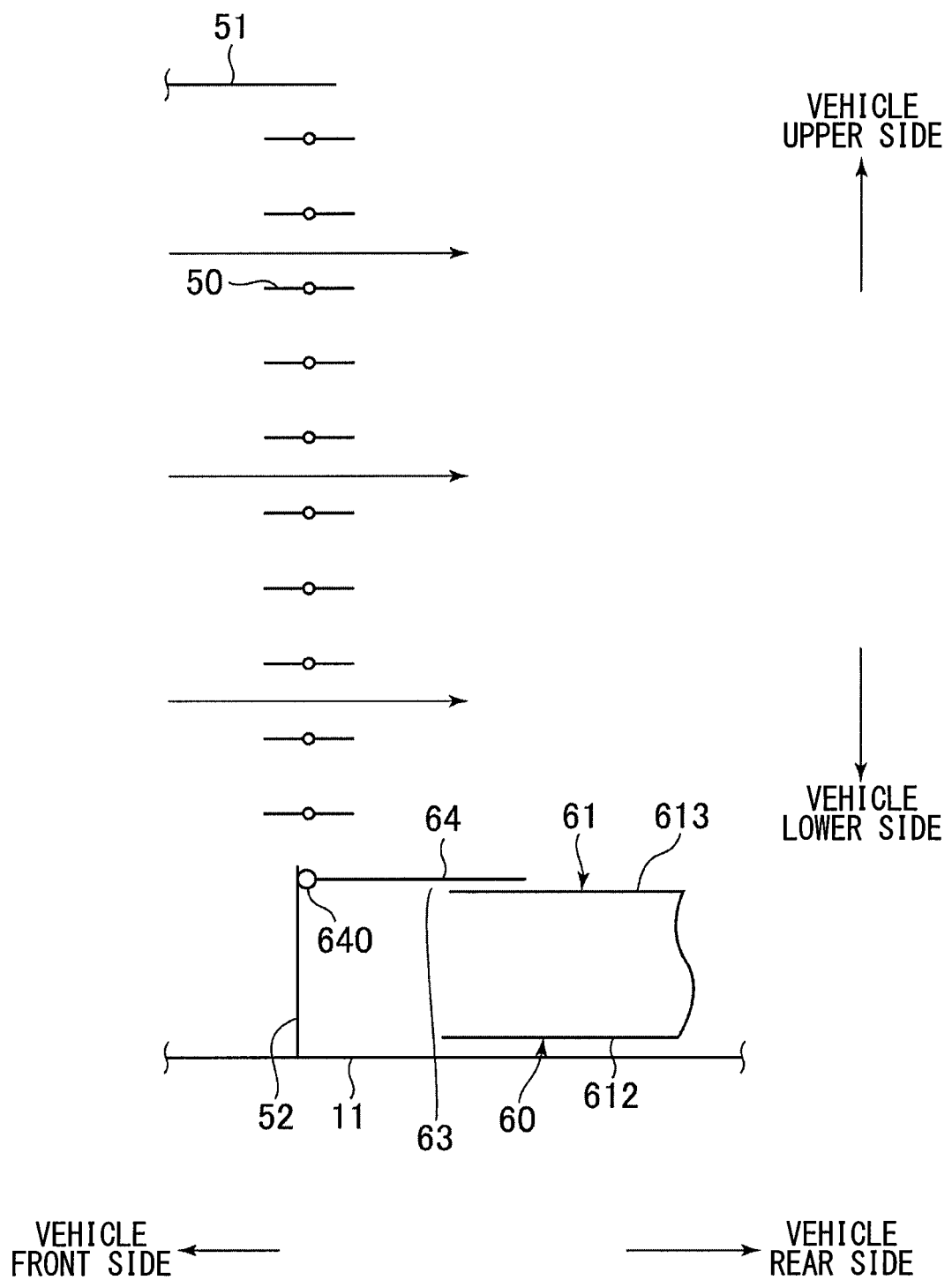
FIG. 4 is a diagram schematically showing an operation example of a front shutter and the under shutter according to the embodiment.
Figure 5:
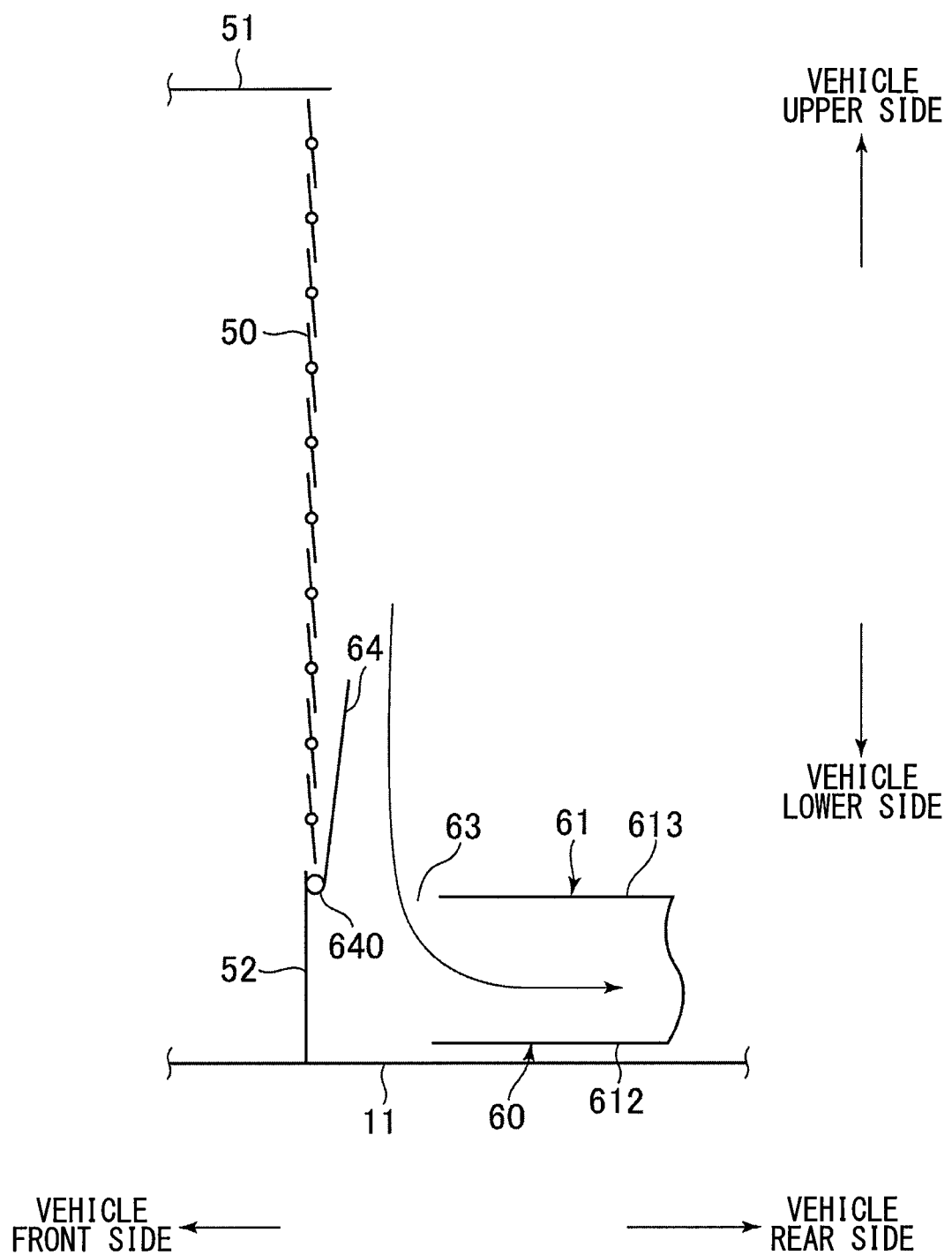
FIG. 5 is a diagram schematically showing an operation example of the front shutter and the under shutter according the embodiment.

Specifically, as shown in FIG. 4, when the front shutter 50 is in the open state, the under shutter 64 is in the closed state. On the other hand, as shown in FIG. 5, when the front shutter 50 is in the closed state, the under shutter 64 is in the open state.

Next, an electrical configuration of the vehicle 1 will be described.

Figure 6:
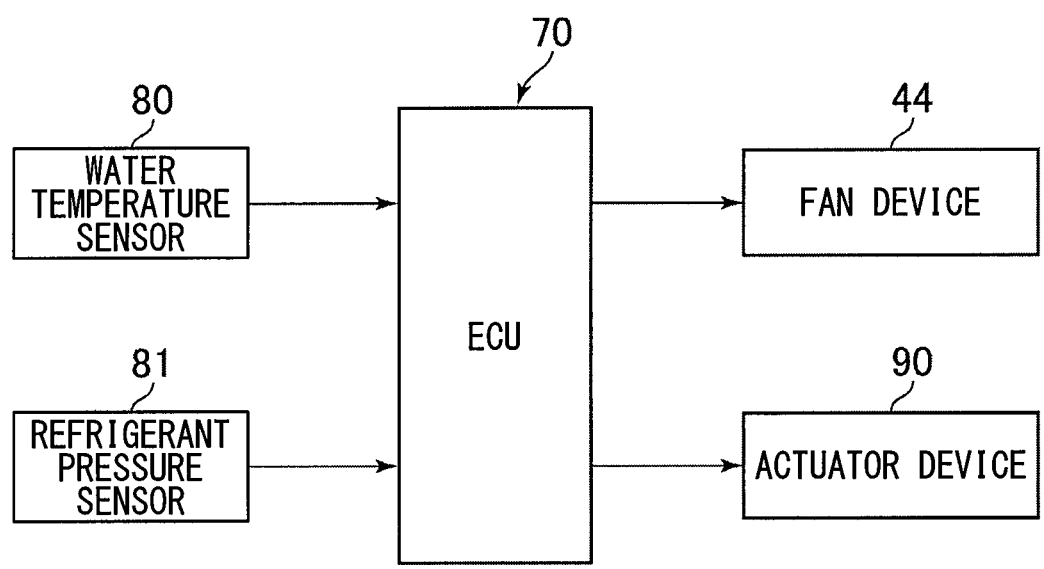
FIG. 6 is a block diagram showing an electrical configuration of a vehicle according to the embodiment.

As shown in FIG. 6, the vehicle 1 includes an ECU 70, a water temperature sensor 80, and a refrigerant pressure sensor 81. The water temperature sensor 80 detects an engine coolant water temperature Tw of the engine 20, and outputs a signal corresponding to the detected engine coolant water temperature Tw. The refrigerant pressure sensor 81 detects a pressure of the refrigerant circulating in the heat pump cycle, and outputs a signal corresponding to a detected refrigerant pressure Pr.

The ECU 70 mainly includes a microcomputer having a CPU, memories, and the like. The ECU 70 detects an engine coolant water temperature Tw and the refrigerant pressure Pr based on output signals of the water temperature sensor 80 and the refrigerant pressure sensor 81. The ECU 70 controls the fan device 44 and the actuator device 90 based on the detected engine coolant water temperature Tw and the detected refrigerant pressure Pr. The actuator device 90 is a device that opens or closes the front shutter 50 and the under shutter 64 in conjunction with each other.

Next, an exemplary operation of the ECU 70 will be described.

Figure 7:
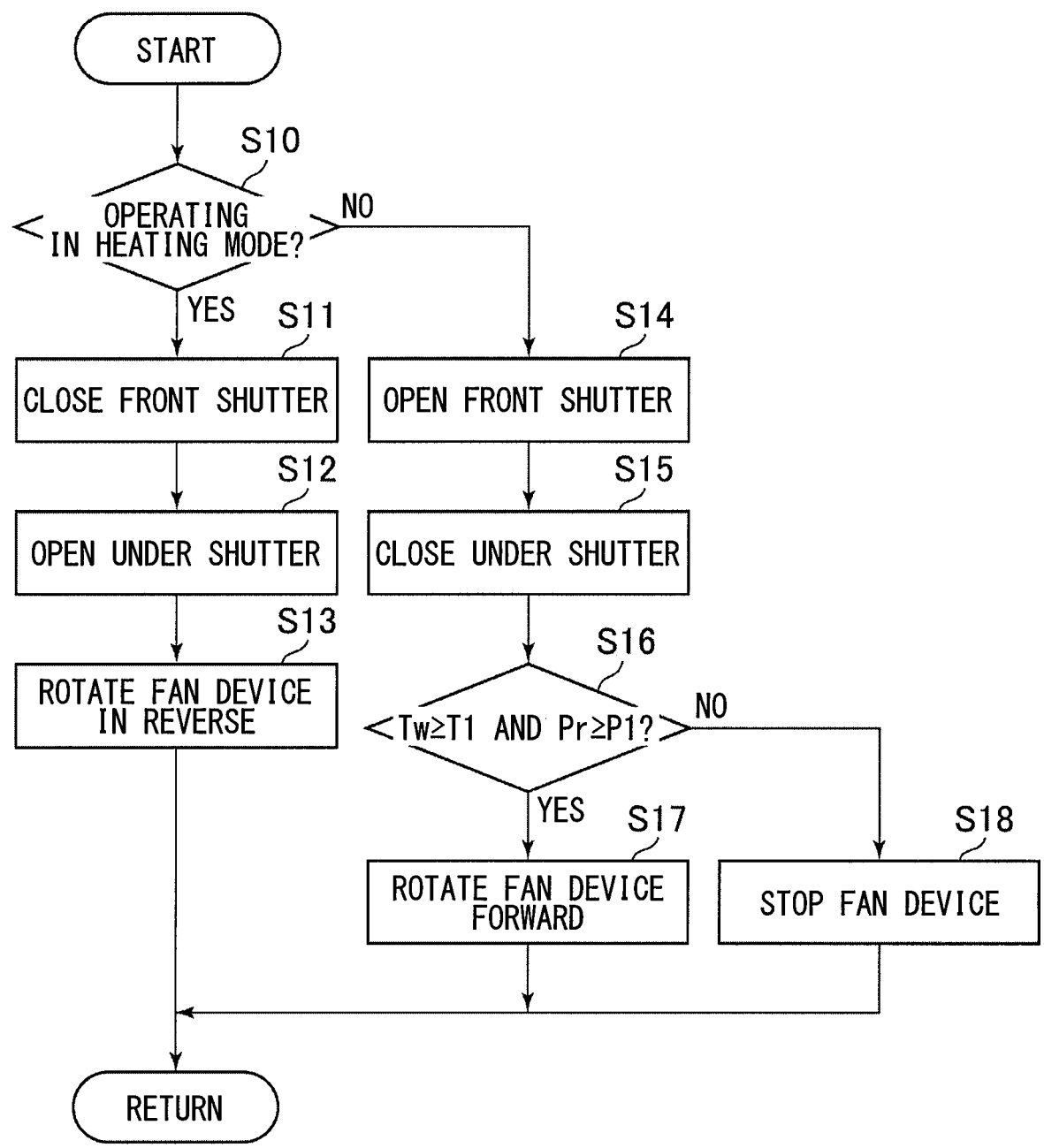
FIG. 7 is a flowchart showing a procedure of processing to be executed by an ECU according to the embodiment.

As shown in FIG. 7, the ECU 70 first determines whether or not the heat pump cycle is operating in the heating mode in a process of Step S10. When an affirmative determination is made in the process of Step S10, that is, when the heat pump cycle is operating in the heating mode, the ECU 70 drives the actuator device 90 as processes of Steps S11 and S12, thereby closing the front shutter 50 and opening the under shutter 64. In addition, the ECU 70 rotates the fan device 44 in the reverse direction as a process of Step S13. As a result, an air flows as indicated by an arrow W2 in FIG. 2.

In other words, with the reverse rotation of the fan device 44, the air is blown in a direction from the engine compartment 10 toward the front shutter 50. Therefore, the air heated in the engine compartment 10 passes through the exterior heat exchanger 41. At this time, the exterior heat exchanger 41 functions as an evaporator in the heat pump cycle. Therefore, a heat exchange is performed between the refrigerant flowing through the exterior heat exchanger 41 and the air passing through the exterior heat exchanger 41, whereby the refrigerant evaporates.

The air passing through the exterior heat exchanger 41 collides with the front shutter 50, thereby changing the air direction to a lower side of the vehicle. As a result, the air colliding with the front shutter 50 is introduced into an inside of the under duct 60 from the introduction port 610 of the under duct 60 through the flow channel 63. The air introduced into the under duct 60 flows toward the discharge port 611, thereby increasing the air flow speed. The air having the increased air flow speed flows along the air guide plate 62, and the air direction changes in a direction oriented to the first exhaust purification catalyst 22. When the air passes through the first exhaust purification catalyst 22, the temperature of the air rises by absorbing a heat of the first exhaust purification catalyst 22. The air is further heated by a heat of the engine 20 while flowing above the engine compartment 10. The air heated in the engine compartment 10 is blown toward the exterior heat exchanger 41 by the reverse rotation of the fan device 44.

As described above, in the vehicle 1, since the air that has collided with the front shutter 50 is reliably guided to the first exhaust purification catalyst 22 and the engine 20 by the under duct 60, a short circuit is less likely to occur in the air flow. In other words, since the air heated by the first exhaust purification catalyst 22 and the engine 20 can be more reliably supplied to the exterior heat exchanger 41, a temperature raising efficiency of the exterior heat exchanger 41 is enhanced. As a result, the heating performance of the heat pump cycle can be improved.

As shown in FIG. 7, when a negative determination is made in a process of Step S10, that is, when the heat pump cycle is operating in the cooling mode, the ECU 70 drives the actuator device 90 as processes of Steps S14 and S15 to open the front shutter 50 and close the under shutter 64. Subsequently, as a process of Step S16, the ECU 70 determines whether or not the engine coolant water temperature Tw is equal to or higher than a predetermined temperature T1 and the refrigerant pressure Pr is equal to or higher than a predetermined pressure P1. When an affirmative determination is made in the process of Step S16, that is, when the engine coolant water temperature Tw is equal to or higher than the predetermined temperature T1 and the refrigerant pressure Pr is equal to or higher than the predetermined pressure P1, the ECU 70 causes the fan device 44 to rotate forward as a process of Step S17. The forward rotation of the fan device 44 and a traveling wind of the vehicle cause the air to flow as indicated by arrows W1 in FIG. 1.

In other words, the outside air introduced from the front grill 30 passes through the front shutter 50 and flows to the exterior heat exchanger 41. At this time, the exterior heat exchanger 41 functions as a condenser in the heat pump cycle. Therefore, the heat exchange is performed between the refrigerant flowing through the exterior heat exchanger 41 and the outside air passing through the exterior heat exchanger 41, to thereby condense the refrigerant.

As shown in FIG. 7, when a negative determination is made in the process of Step S16, that is, when the engine coolant water temperature Tw is less than the predetermined temperature T1 or the refrigerant pressure Pr is less than the predetermined pressure P1, the ECU 70 stops the fan device 44 as a process of Step S18. In this case, the air flows as indicated by an arrow W1 in FIG. 1 due to the traveling wind of the vehicle.

According to the air flow circulation structure of the vehicle 1 of the present embodiment described above, the following functions and effects (1) to (5) can be obtained.

(1) The vehicle 1 includes, as an air flow circulation structure for circulating the air to the exterior heat exchanger 41, the front shutter 50 that opens or closes the outside air intake port 13, the reversely rotatable fan device 44, and the under duct 60 that guides the air whose direction has changed by colliding with the front shutter 50 to the first exhaust purification catalyst 22. As a result, the air heated by the engine 20 and the first exhaust purification catalyst 22 can be more reliably supplied to the exterior heat exchanger 41, so that the heating performance of the heat pump cycle can be improved.

(2) The under duct 60 is disposed adjacent to the under cover 11 of the vehicle 1. The under duct 60 is formed so that the flow channel cross-sectional area becomes narrower from the introduction port 610 toward the discharge port 611. As a result, the air flow speed increases more from the introduction port 610 toward the discharge port 611, so that the air can be more reliably applied to the first exhaust purification catalyst 22. Therefore, since the air can be heated more reliably, the heating performance of the heat pump cycle can be further improved.

(3) The under duct 60 has the air guide plate 62 that changes the direction of the air discharged from the discharge port 611 to a direction oriented to the first exhaust purification catalyst 22. This makes it possible to more reliably apply the air to the first exhaust purification catalyst 22. Therefore, since the air can be heated more reliably, the heating performance of the heat pump cycle can be further improved.

(4) The vehicle 1 includes the under shutter 64 that opens or closes the flow channel 63 that guides the air that has collided with the front shutter 50 to the introduction port 610, as an air flow circulation structure that circulates the air to the exterior heat exchanger 41. As a result, when the heat pump cycle is operated in the cooling mode, the under shutter 64 is closed, as a result of which the outside air suctioned from the outside air intake port 13 is less likely to flow into the under duct 60. In other words, since the outside air suctioned from the outside air intake port 13 more reliably passes through the exterior heat exchanger 41, the deterioration of the function of the exterior heat exchanger 41 as a condenser can be reduced. This makes it possible to reduce the deterioration of the cooling function of the heat pump cycle.

(5) The vehicle 1 includes the actuator device 90 for interlocking the opening and closing of the front shutter 50 with the opening and closing of the under shutter 64 as the air flow circulation structure for circulating the air to the exterior heat exchanger 41. As a result, the structure can be simplified as compared with the case where an actuator device for opening and closing the under shutter 64 is provided in addition to the actuator device for opening and closing the front shutter 50.

The above embodiment can also be implemented by the following configuration.

Figure 8:
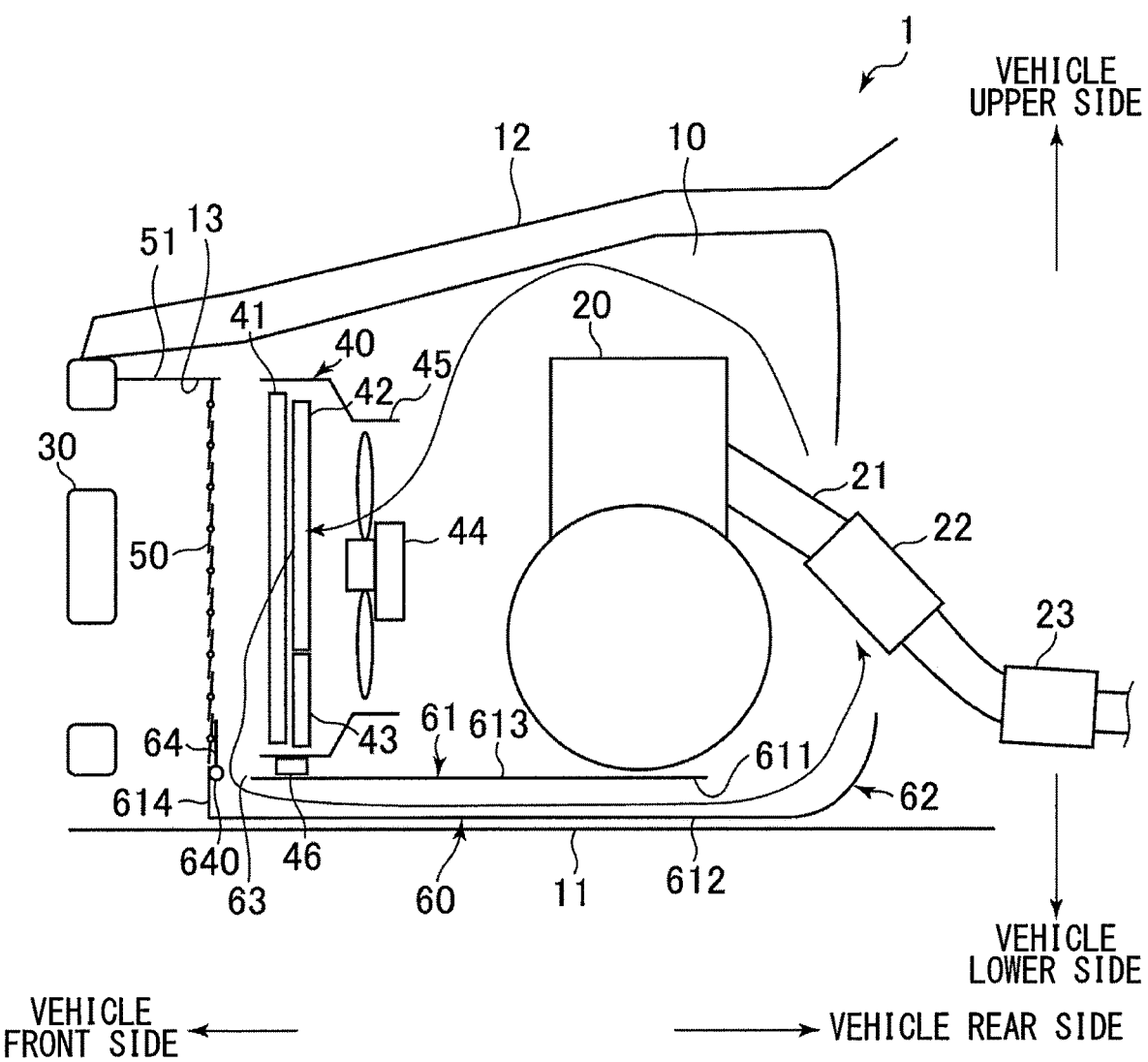
FIG. 8 is a diagram schematically showing a schematic configuration of a front portion of a vehicle according to another embodiment.

As shown in FIG. 8, the under duct 60 may include the bottom wall portion 612 extending to the vehicle lower side of the front shutter 50, and the protrusion wall 614 extending from an end portion of the bottom wall portion 612 on the vehicle front side to the vehicle upper side. With the use of the under duct 60 described above, there is a need to form the protrusion wall 52 on the under cover 11.

Figure 9:
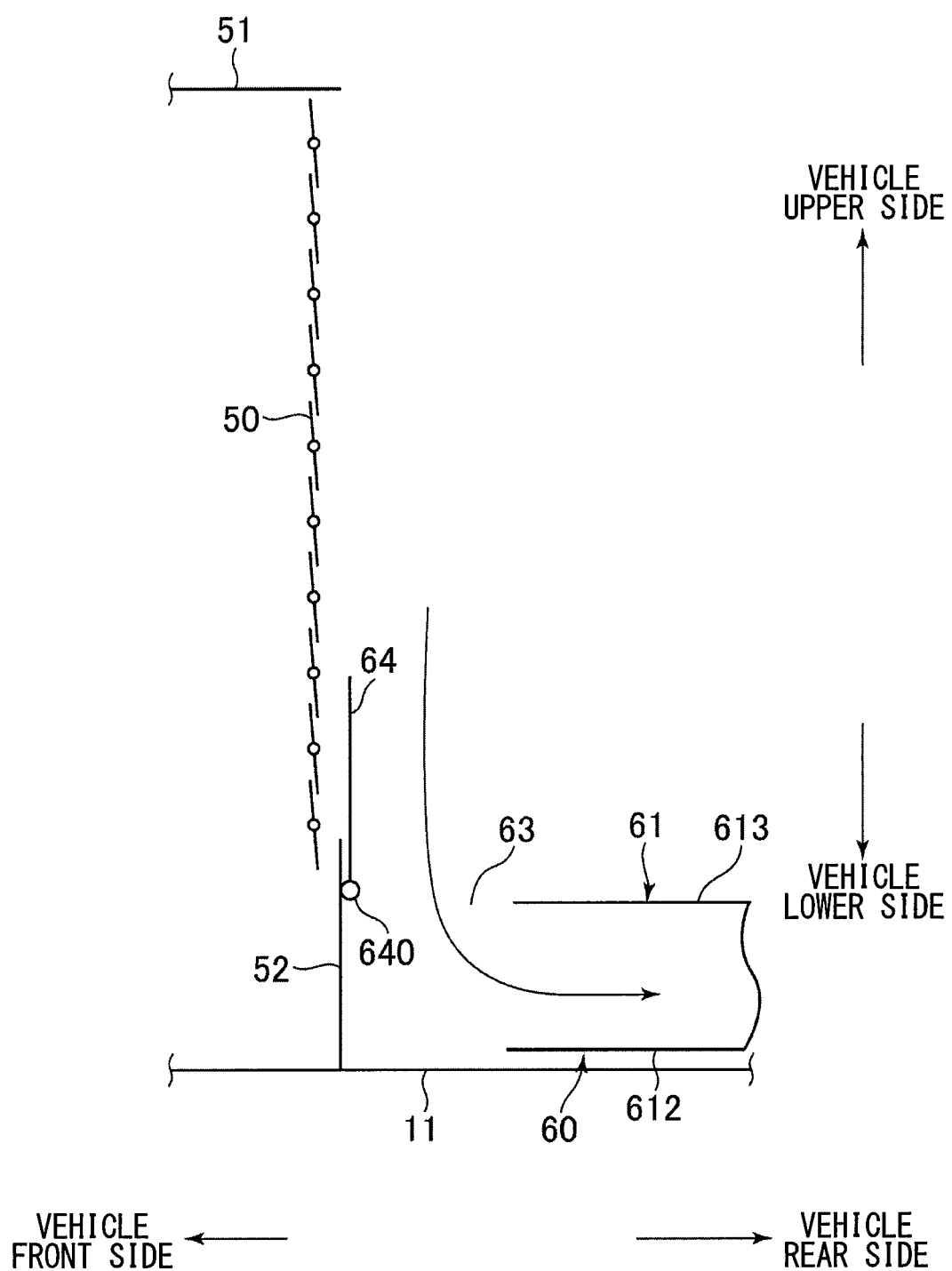
FIG. 9 is a diagram schematically showing an operation example of a front shutter and an under shutter according to another embodiment.
Figure 10:
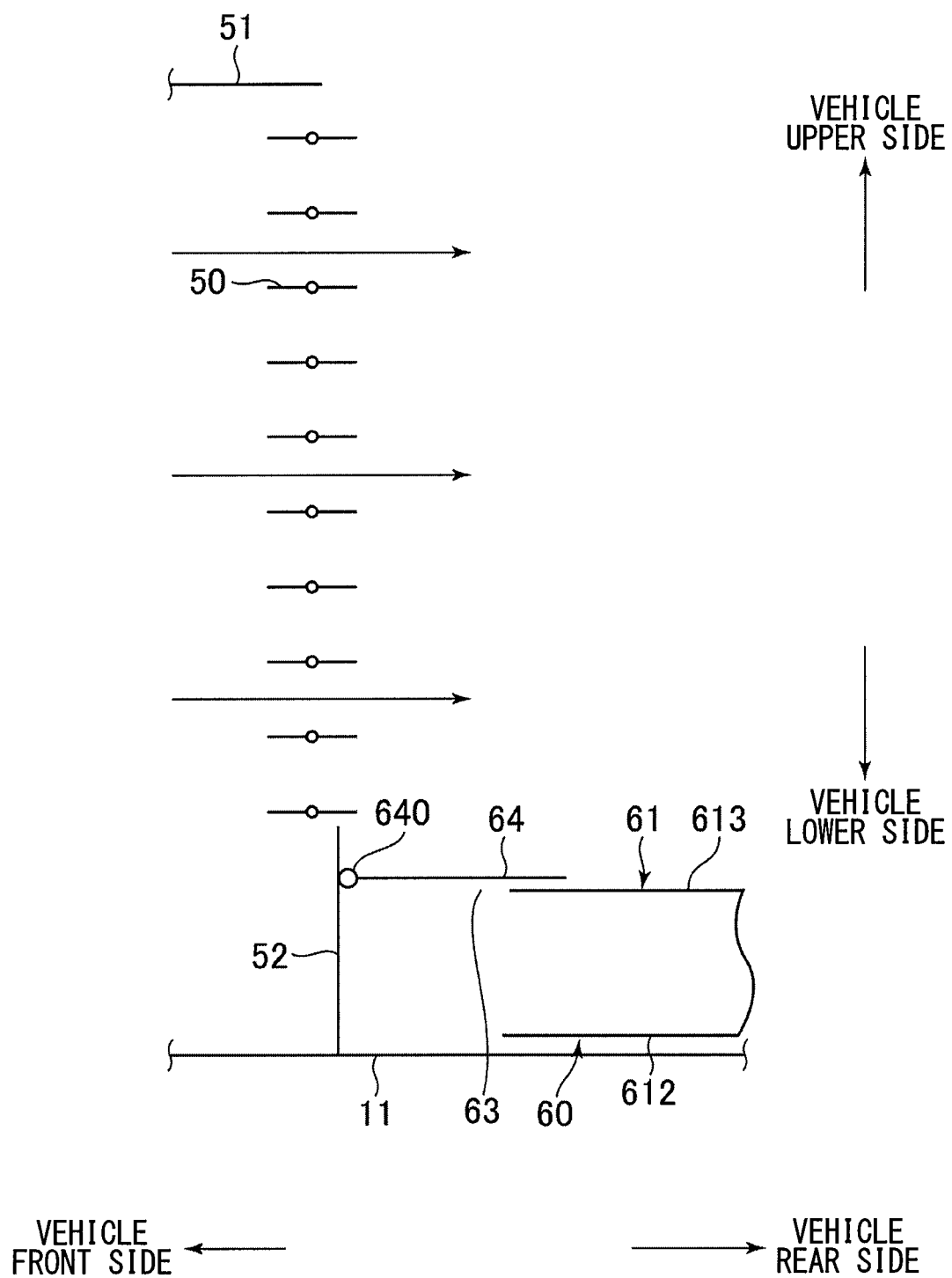
FIG. 10 is a diagram schematically showing an operation example of the front shutter and an under shutter according to another embodiment.

The under shutter 64 is not limited to the configuration that is operated to open or close by the actuator device 90, but may be configured to be operated to open or close based on an urging force applied from an elastic member such as a spring. For example, as shown in FIG. 9, when the front shutter 50 is in the closed state, the under shutter 64 is held in the open state by the urging force applied from an elastic member not shown. As shown in FIG. 10, when the front shutter 50 is in the open state, the under shutter 64 is held in the closed state against the urging force of the elastic member by the air pressure of the outside air suctioned from the outside air intake port 13. According to the configuration described above, the under shutter 64 can be opened and closed with a simpler structure.

Figure 11:
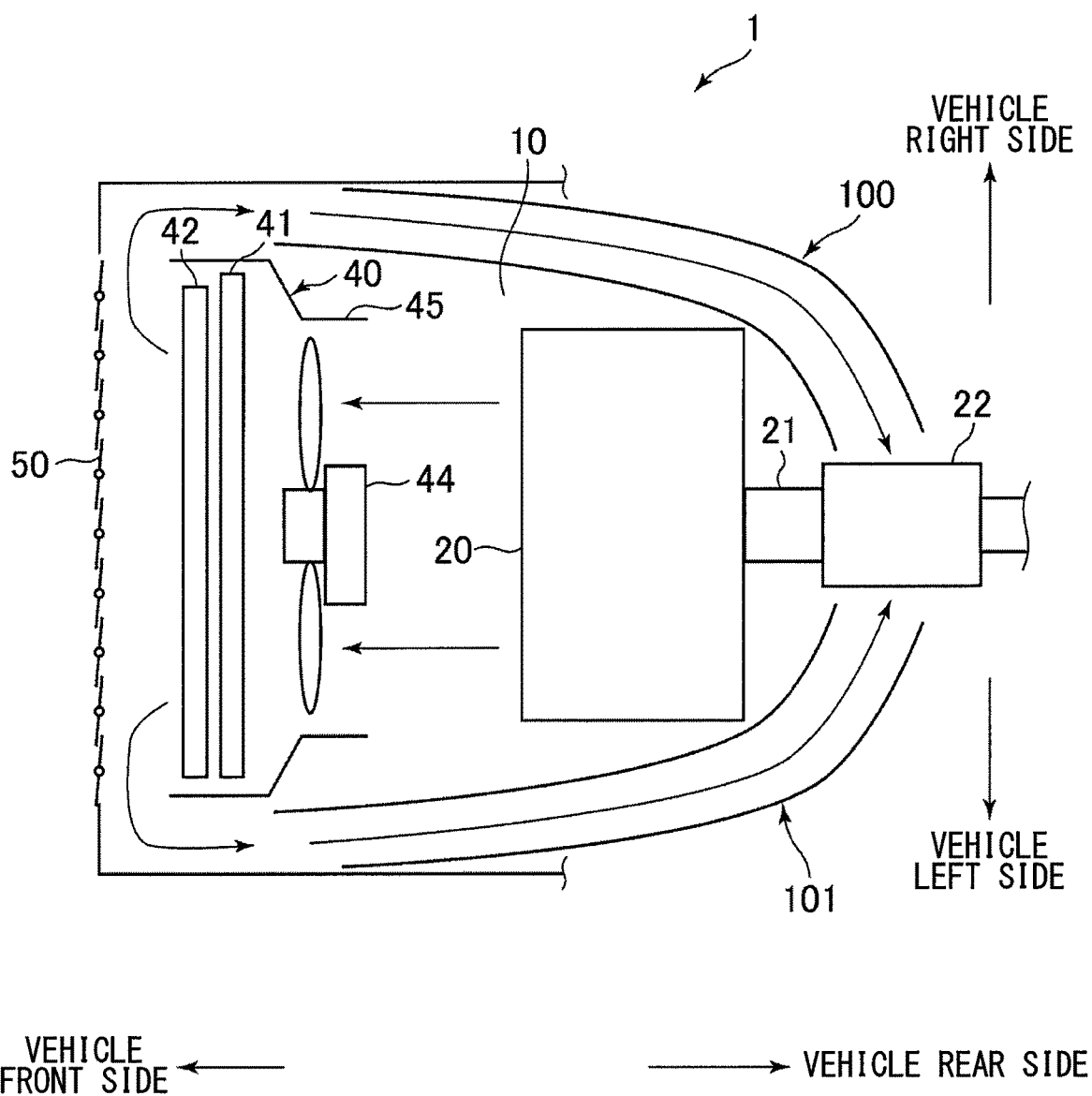
FIG. 11 is a diagram schematically showing a schematic configuration of a front portion of a vehicle according to another embodiment.

The structure of the duct member that guides the air whose direction has changed by colliding with the front shutter 50 to the first exhaust purification catalyst 22 is not limited to the structure of the under duct 60, and can be appropriately changed. For example, as shown in FIG. 11, the duct members 100 and 101 may be used. The duct member 100 is disposed in the right direction of the vehicle with respect to the shroud 45 and the engine 20. The duct member 101 is disposed in the left direction of the vehicle with respect to the shroud 45 and the engine 20. The duct members 100 and 101 are disposed so as to extend from the vicinity of the shroud 45 to the vicinity of the first exhaust purification catalyst 22. Even when the duct members 100 and 101 described above are used, the same effects and effects as those of the above embodiment can be obtained.

Figure 12:
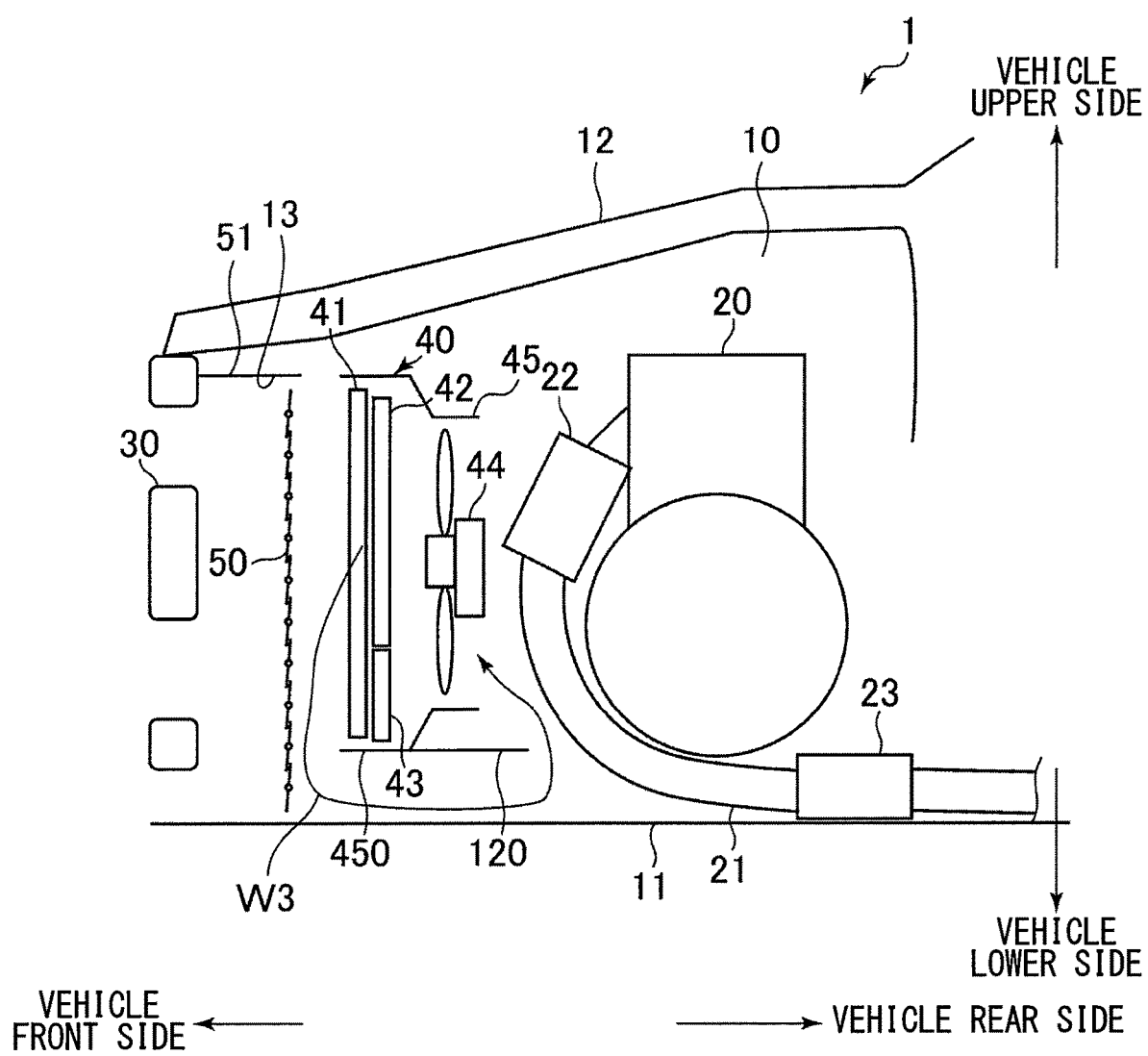
FIG. 12 is a diagram schematically showing a schematic configuration of a front portion of a vehicle according to another embodiment.

As shown in FIG. 12, when the engine 20 is a front exhaust engine, a duct member 120 shown in the figure may be used. The duct member 120 is disposed along a bottom wall portion 450 which is disposed below the vehicle, in the outer wall which covers the periphery of the exterior heat exchanger 41, the high-temperature radiator 42, and the low-temperature radiator 43 in the shroud 45. The duct member 120 is provided so as to extend the bottom wall portion 450 of the shroud 45 toward the rear of the vehicle. As a result, as indicated by an arrow W3 in FIG. 12, when the air that collides with the front shutter 50 flows through a gap between the shroud 45 and the under cover 11, the air is guided to the exhaust pipe 21 and the first exhaust purification catalyst 22 of the engine 20, which are heat sources, without short circuiting. Therefore, the air supplied to the exterior heat exchanger 41 can be heated more reliably, so that the heating performance of the heat pump cycle can be improved.

Figure 13:
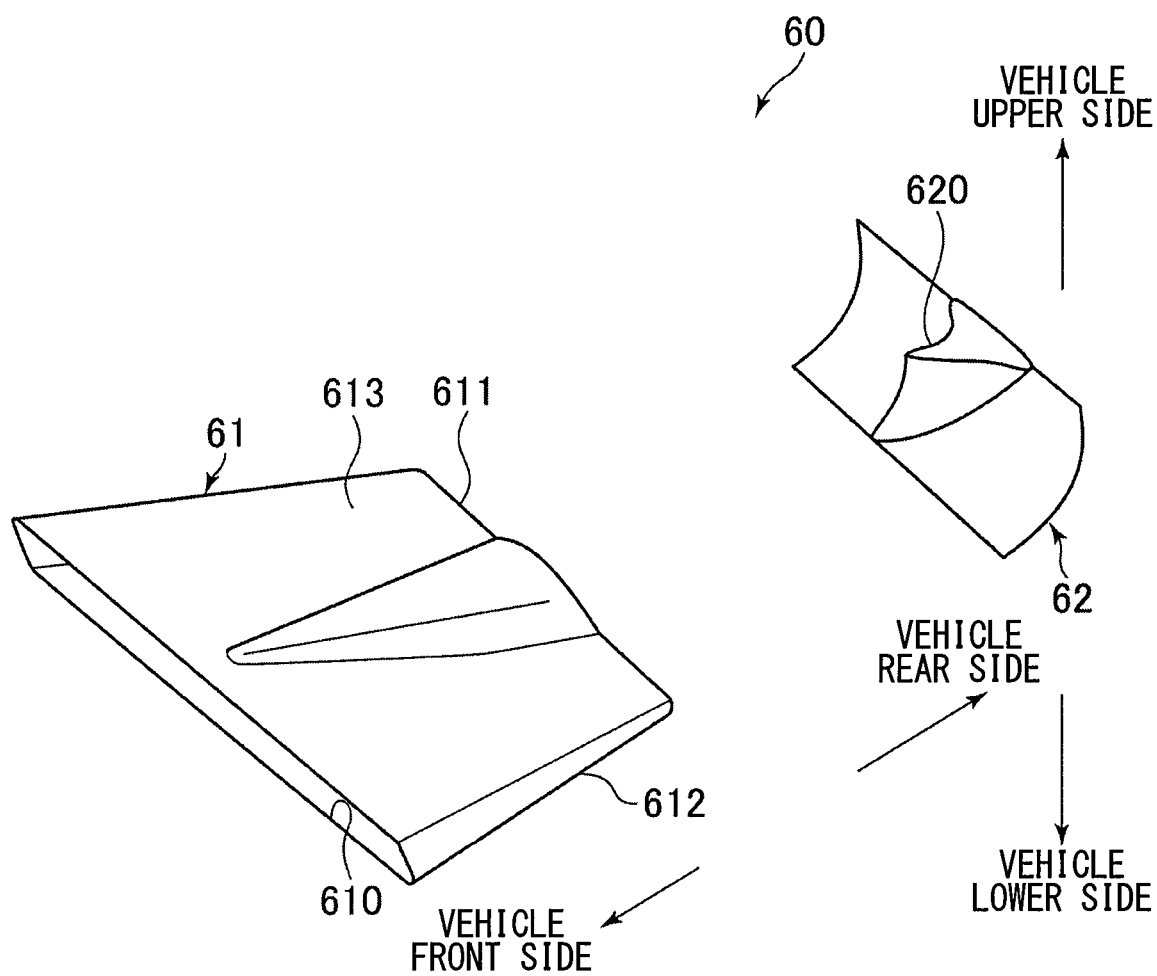
FIG. 13 is a perspective view showing a perspective structure of an under duct according to another embodiment.

As shown in FIG. 13, a flow dividing portion 620 may be formed in the air guide plate 62 of the under duct 60. The flow dividing portion 620 divides a flow of the air discharged from the discharge port 611 of the under duct 60 so as to flow along both side surfaces of the first exhaust purification catalyst 22 in the left-right direction of the vehicle. According to the configuration described above, a ventilation resistance when the air discharged from the under duct 60 passes through the first exhaust purification catalyst 22 can be reduced.

The heat source to which the air is guided by the duct member is not limited to the first exhaust purification catalyst 22, the exhaust pipe 21, and the engine 20, but may be, for example, an exhaust manifold, a turbocharger, a motor, or an inverter.

The present disclosure is not limited to the specific examples described above. The above specific examples that are appropriately modified in design by those skilled in the art are also encompassed in the scope of the present disclosure, as far as the modified specific examples have the features of the present disclosure. Each element included in each of the specific examples described above, and the placement, condition, shape, and the like of the element are not limited to those illustrated, and can be modified as appropriate. The elements included in each of the specific examples described above can be appropriately combined as long as there is no technical contradiction.

What is claimed is:

1. An air flow circulation structure for a vehicle, which is configured to circulate air to a heat exchanger of a heat pump cycle disposed between an outside air intake port and an engine compartment of a vehicle, the air flow circulation structure comprising:
   a front shutter configured to open or close the outside air intake port;
   a fan configured to cause air to flow in a direction oriented from the outside air intake port through the heat exchanger toward the engine compartment when the front shutter is in an open state, and to cause the air to flow in a direction oriented from the engine compartment through the heat exchanger toward the outside air intake port when the front shutter is in a closed state; and
   a duct member configured to guide the air that is changed in direction by blowing from the fan and colliding with the front shutter, to a heat source of the vehicle, when the front shutter is in the closed state, wherein
   the duct member is disposed adjacent to an under cover of the vehicle, and
   the duct member is provided with a flow channel cross-sectional area set to be narrower from an introduction port for introducing the air changed in direction by colliding with the front shutter, as toward a discharge port for discharging the air to the heat source.

2. The air flow circulation structure for a vehicle according to claim 1, wherein
   the duct member has an air guide plate that changes a direction of the air discharged from the discharge port to a direction toward the heat source.

3. The air flow circulation structure for a vehicle according to claim 1, further comprising an under shutter that opens or closes a flow channel for guiding the air colliding with the front shutter to the introduction port.

4. The air flow circulation structure for a vehicle according to claim 3, wherein
   the under shutter is held in an open state based on an urging force applied from an elastic member when the front shutter is in the closed state, and
   the under shutter is configured to become into a closed state by a pressure of the air drawn from the outside air intake port when the front shutter is in the open state.

5. The air flow circulation structure for a vehicle according to claim 3, further comprising
   an actuator configured to interlocks the opening or closing state of the front shutter in accordance with the opening or closing state of the under shutter.

6. The air flow circulation structure for a vehicle according to claim 1, wherein the heat source is one of an exhaust manifold, a turbocharger, an exhaust purification catalyst, a motor, or an inverter of the vehicle.

7. The air flow circulation structure for a vehicle according to claim 3, further comprising
   a flow dividing portion provided in the air guide plate and configured to divide a flow of the air discharged from the discharge port of the duct member to flow along both side surfaces of the heat source in a left-right direction of the vehicle.

8. The air flow circulation structure for a vehicle according to claim 1, wherein the duct member includes a plurality of ducts provided along a left-right direction of the vehicle.

9. The air flow circulation structure for a vehicle according to claim 1, wherein
   the outside air intake port is provided with an inner wall surface extending from a front grill toward the engine compartment, and
   the front shatter is provided between the front grill and the heat exchanger.

10. The air flow circulation structure for a vehicle according to claim 1, wherein the front shatter is arranged at a position closer to the heat exchanger, than the front grill.

11. An air flow circulation structure for a vehicle, which is configured to circulate air to a heat exchanger of a heat pump cycle, disposed between an outside air intake port and an engine compartment of a vehicle, the air flow circulation structure comprising:
    a front shutter configured to open or close the outside air intake port;
    a fan configured to cause air to flow in a first direction oriented from the outside air intake port through the heat exchanger toward the engine compartment when the front shutter is in an open state, and to cause the air to flow in a second direction oriented from the engine compartment through the heat exchanger toward the outside air intake port when the front shutter is in a closed state; and
    a duct member disposed adjacent to an under cover of the vehicle, to guide the air when the front shutter is in the closed state, wherein
    the duct member has an introduction port from which the air flowing into a portion between the front shutter and the heat exchanger is introduced in the closed state of the front shutter, and a discharge port from which the air introduced from the introduction port is discharged toward the heat source in the closed state of the front shutter, and
    the duct member is provided with a flow channel cross-sectional area that becomes narrower from the introduction port toward the discharge port.

* * * * *